(12) United States Patent
Malshe et al.

(10) Patent No.: US 11,720,850 B1
(45) Date of Patent: Aug. 8, 2023

(54) DYNAMIC PACKAGE SELECTION ALGORITHM FOR DELIVERY

(71) Applicant: Amazon Technologies, Inc., Seattle, WA (US)

(72) Inventors: Rohit Malshe, Bellevue, WA (US); Liron David Yedidsion, Redmond, WA (US); Abhilasha Prakash Katariya, Issaquah, WA (US); Dipal Patel Gupta, Issaquah, WA (US); Jin Ye, Kirkland, WA (US); Natarajan Gautam, College Station, TX (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 16/989,364

(22) Filed: Aug. 10, 2020

(51) Int. Cl.
| | | |
|---|---|---|
| G06Q 10/00 | (2023.01) | |
| G06N 5/00 | (2023.01) | |
| G06N 20/00 | (2019.01) | |
| G06Q 30/00 | (2023.01) | |
| G06Q 10/0835 | (2023.01) | |
| G06Q 10/047 | (2023.01) | |
| G06Q 30/0204 | (2023.01) | |
| G06N 5/04 | (2023.01) | |
| G06Q 10/0834 | (2023.01) | |
| G06Q 10/0631 | (2023.01) | |
| G06Q 10/083 | (2023.01) | |

(52) U.S. Cl.
CPC ......... *G06Q 10/08355* (2013.01); *G06N 5/04* (2013.01); *G06N 20/00* (2019.01); *G06Q 10/047* (2013.01); *G06Q 10/06315* (2013.01); *G06Q 10/0838* (2013.01); *G06Q 10/08345* (2013.01); *G06Q 30/0205* (2013.01)

(58) Field of Classification Search
CPC .......... G06Q 10/00–50/00; G06N 5/00–20/00
USPC ................................................ 705/7.11–7.42
See application file for complete search history.

(56) References Cited

U.S. PATENT DOCUMENTS

| | | | |
|---|---|---|---|
| 6,571,213 B1* | 5/2003 | Altendahl | G06Q 10/047 705/330 |
| 11,232,394 B1* | 1/2022 | Pinette | H04L 67/306 |
| 11,537,977 B1* | 12/2022 | Malhotra | G06Q 10/08355 |
| 2006/0265234 A1* | 11/2006 | Peterkofsky | G06Q 10/08 705/7.11 |

(Continued)

*Primary Examiner* — Mustafa Iqbal
(74) *Attorney, Agent, or Firm* — Kilpatrick Townsend & Stockton LLP

(57) ABSTRACT

Techniques for a package selection feature for selecting subsets of packages and generating instructions to deliver selected packages are described herein. A model may be generated for recursively determining future forecast for potential deliveries associated with a geographic location based at least in part on capacity constraints, delivery vehicle capacity, and historical delivery data for the geographic location. Information that identifies a set of packages for delivery to the geographic location during a first duration may be received. A value for each subset of a plurality of subsets for the set of packages may be determined based on an algorithm that uses the future forecasts and the information. A particular subset may be selected for delivery to the geographic location for a given carrier during a duration based on an algorithm that uses various parametric values for the particular subset, the future forecasts, and the information.

17 Claims, 9 Drawing Sheets

(56) References Cited

U.S. PATENT DOCUMENTS

| | | | |
|---|---|---|---|
| 2008/0077464 A1* | 3/2008 | Gottlieb | G06Q 10/087 |
| | | | 705/28 |
| 2019/0220785 A1* | 7/2019 | Tanno | G06Q 10/083 |
| 2020/0090296 A1* | 3/2020 | Kong | G06Q 50/28 |
| 2021/0334713 A1* | 10/2021 | Edgar | G06Q 10/0631 |
| 2022/0101249 A1* | 3/2022 | Wuorinen | G01C 21/3415 |
| 2023/0056624 A1* | 2/2023 | Moyal | G06Q 10/083 |

* cited by examiner

DYNAMIC PACKAGE SELECTION ALGORITHM FOR DELIVERY

BACKGROUND

Some merchants and e-commerce organizations offer delivery of their goods to a consumer's residence as a service. As cities and towns grow larger and population density increases, it becomes more difficult to determine which packages to select for delivery by a self-owned delivery service and which packages to defer to third party delivery service. For example, conventional package assignment methods use static methods which only account for the specific packages parameters such as the size of the package and the time to deliver the package. However, using conventional package assignment methods can result in unbalanced assignment to particular delivery vehicles, missed revenue for deferred packages, and underutilized capacity in some delivery vehicles. Moreover, conventional package assignment methods may take too long to respond to the dynamic nature of package deliveries for a geographical area let alone multiple geographical areas.

BRIEF DESCRIPTION OF THE DRAWINGS

Various embodiments in accordance with the present disclosure will be described with reference to the drawings, in which.

DETAILED DESCRIPTION

Figure 1:
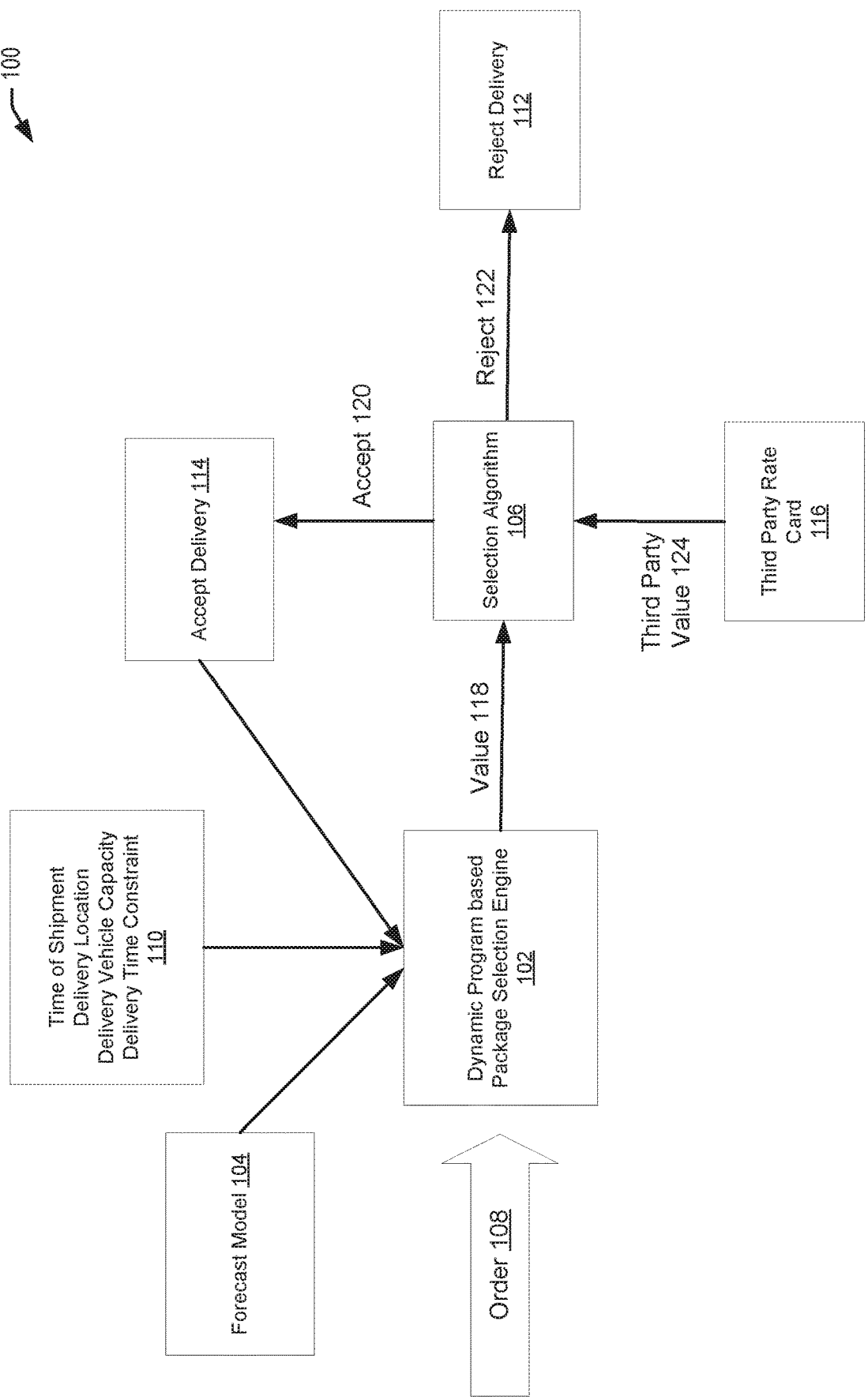
FIG. 1 illustrates a workflow for a package selection feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a package selection or assignment feature for dynamically selecting or assigning which packages to accept for delivery to a geographic location and which packages to defer to a third party delivery entity to deliver to the geographic location. The package selection or assignment feature (package selection feature) may include one or more models or algorithms that take into account not only the constraints of a package, or subset of packages, but also a future forecast of demand for the geographic location, data about packages already selected and assigned for the geographic location and/or delivery vehicle, time of day, driver time capacities, and other information that is not utilized by conventional package selection and assignment methods. In accordance with at least one embodiment, the package selection feature utilizes variables which capture the dynamic aspect of the package selection including a future forecast, actual demand (e.g., information associated with current delivery requests for a geographic location), a geographic location, a delivery time constraint, size and weight of the package (cubic feet), estimated delivery time, delivery vehicle capacity, and coincidence—having several packages delivered to close by addresses. In embodiments, the package selection feature may utilize additional variables such as a value of a package as well as third party delivery identities. The variables are modifiable by an entity such as an administrator associated with the service provider computers implementing the package selection feature.

Conventional cost allocation algorithms typically work with single discrete capacitated resources such as a number of available spots for a transport service. Package selection and assignment algorithms, on the other hand, use a static approach and usually refer to a single continuous variable, such as cubic feet or sometimes the geographical location. However, the dynamic package selection feature described herein balances between two capacities, cubic feet volume of a package as well as a delivery time constraint. This is a difficult process as the two capacities are continuous with a delivery time constraint being non-linear. The balancing mechanism of the package selection feature allows for more granularity while considering the assortment of packages with respect to size and distribution that are expected to be delivered. A static approach that only considers the two capacities in vacuum without considering other variables such as delivery location (e.g., commercial location versus a residential location), delivery vehicle type (delivery vehicle capacity), when an order for delivery is placed (e.g., 7 AM versus 7 PM) and its effect on the probability of coincidence, fails to account for the dynamic nature of package selection that can cause significant underutilization of resources such as shift time of the drivers and cubic feet capacity of delivery vehicles. The package selection feature implemented by the service provider computers uses algorithms and models which consider a time-of-day associated with a set of packages for delivery to a geographic location, the total cubic feet and total delivery time of packages already selected prior to the time of day for the set of packages, as well as a future forecast of future demand for the geographic location to account for future orders to deliver packages. By utilizing this data and other information the package selection feature can provide a reliable distribution of demand for package delivery on many different types of granularity for a given geographical area at a time-of-day. The package selection feature can also use input regarding which packages are selected for which time periods during the day to further update the implemented algorithms and models for subsequent selection decisions. It should be noted that although packages are referred to throughout the present disclosure, the package selection feature may utilize any suitable object with a finite capacity and that consumes space. Examples of packages may include cubical or non-cubical objects, flexible or non-flexible objects, boxes, polybags, etc.

A geographic location may include a set of geographical coordinates that define a boundary for a sector or portion of a geographical area. The package selection feature may select packages for a geographic location that includes one or more delivery routes, ZIP codes, delivery stations, or other suitable geographic locations. A delivery time constraint, which may be referred to as a time to shipment, may include a time period for which a delivery is required to be delivered to a delivery location. Coincidence may include an identification of one or more deliveries that have already been selected for delivery to a same point, area, portion, route, or geographic location as an incoming order for delivery. In a non-limiting example, assume decisions to select or reject packages are made in fifteen minute intervals throughout a given day. Orders to deliver packages may be received conscientiously throughout this day which remain in a pool while decisions regarding accepting or rejecting said package deliveries are made constantly.

The package selection feature may make decisions in time snapshots (certain duration) in which decisions to accept or reject certain package deliveries are locked in. The package selection feature allows a package to remain in an unassigned state for a maximum duration that depends on package characteristics such as a delivery time constraint. The service provider computers implementing the package selection feature may implement one or more algorithms that use input such as package delivery demands for the past period (last 15 minutes) as well as data for the current package deliveries such as delivery location, cubic size, and a third party cost provided by a third party delivery service to deliver the package. The service provider computers may determine an estimated delivery time based on at least the delivery location. The package selection feature considers a forecast of demands for package deliveries within the geographic location until the end of the day as well as the specific demand for package deliveries already selected along with other information to make a decision to either accept a subset of packages or reject the subset of packages.

In accordance with at least one embodiment, the service provider computers implementing the package selection feature may be configured to generate and transmit delivery routes for delivering the selected packages to the geographic location. The routes generated by the service provider computers may be generated dynamically once a package selection time period has elapsed (e.g., end of day). In embodiments, the delivery routes may be transmitted to user devices of delivery associates associated with the service provider computers, an online retailer, or other suitable delivery entity. The service provider computers may generate and transmit instructions to third party computers for delivering rejected (not selected) packages for delivery to the geographic location. The service provider computers implementing the package selection feature may obtain information that includes historical delivery data for the geographical location. The historical delivery data may be for a certain previous duration or time period that is specified by input from an entity associated with the service provider computers.

FIG. 1 illustrates a workflow 100 for a package selection feature, in accordance with at least one embodiment. In workflow 100 one or more service provider computers (not pictured) may implement the dynamic program based package selection engine (first algorithm) 102, the forecast model 104, and selection algorithm (second algorithm) 106. In embodiments, the service provider computers may receive information including an order for delivery 108, information about the order 110 including a time of shipment, delivery location for the order, delivery vehicle capacity, and a delivery time constraint for the order. The service provider computers may provide instructions to one or more other computer such as third party computers (not pictured) when rejecting a delivery 112, or other computers when accepting a delivery 114. The service provider computers may receive information from third party computers such as a third party rate card 116 that includes information for how much it would cost for a third party to deliver the order 108. In embodiments, the decision to accept delivery 114 for an order, such as order 108, may be used as a data point that is provided to the dynamic program based package selection engine 102 to update the engine or algorithm.

In embodiments, the order 108 may correspond to a number of orders for delivery where each order is associated with a different package such that a given order may include cubic feet and delivery time constraints for a corresponding package that is different from the package metrics for another given order. In accordance with at least one embodiment, the workflow 100 includes receiving an order 108, information about the order 110, and a forecast model 104 for use in the dynamic program based selection engine 102. The package selection feature which includes the dynamic program based package selection engine 102 may be configured to generate a value 118 for each potential subset of solutions associated with accepting or rejecting the order 108. The value 118 may be provided to the selection algorithm 106 which uses the value 118 along with other information, such as the forecast model 104 to make a decision to accept delivery 114 (accept 120) or reject delivery 112 (reject 122). In embodiments, the selection algorithm 106 may utilize the third party value 124 provided in the third party rate card 116 as input for determining whether to accept 120 or reject 122 the order 108. It should be noted that the order 108 may include a combination of orders (a set of packages) received during a certain duration (e.g., 15 minutes) where each order is for one or more packages of varying metrics (cubic feet and time delivery constraint). The selection algorithm 106 may be configured to select an optimal subset of the set of packages that includes accepting a portion of the set of packages of varying metrics to optimally utilize vehicle capacity (delivery vehicle capacity), driver time capacity, while balancing orders already accepted and potential orders still to be received for a geographic location (one or more delivery locations or routes for a geographical area).

The service provider computers implementing the package selection feature may utilize one or more assumptions for implementing the algorithms and models such as the forecast model 104, the dynamic program based package selection engine 102, and the selection algorithm 106. For example, the package selection feature may include an assumption that the demand of deliveries for a geographic location is distributed according to Poisson distribution and independent and identically distributed random variables, which means that the given demand at a point of time in the day does not reflect on the future forecast of demand for the geographic location. Assume the following notations: h=0, .

..., H, where H represents the end of the day and each h represents a time-snapshot (certain duration of the day). Further assume that $o_i$—represents the $i^{th}$ order placed. Each order $o_i$ is an object with the following attributes: $o_i.a$ represents the address of order $o_i$; $o_i.q$ represents the cubic-feet of order $o_i$; $o_i.h$ represents the period in which order $o_i$ was placed; and $o_i.b$ represents order $o_i$'s alternative cost of shipment (e.g., the cost of rejection which may be referred to as a baseline cost). $S_h$ may represent the state of the system at period h.

The state of the system, $S_h$ may be a set of all the orders accepted until period h−1 including, where the set $S_h$ is an object with the following attributes: $S_h.q$ represents the total cubic feet of set $S_h$:$S_h.q=\Sigma_{o_i \in s_h} o_i.q$; $S_h.t$ represents the estimated total delivery time constraint (on-zone time) required to deliver all the packages of set $S_h$; $\overline{S}_h$ represents the complementary set to $S_h$ holding all the rejected orders until period h−1 including. Assume $D_h=\{o_i:o_i.h=h\}$ represents the set of all orders placed at period h. Assume further that $A_n \subseteq D_h$ represents a subset of orders to consider accepting at period h. $\Gamma_h$ may represent a superset containing of all possible sets $A_h$. The algorithms and future forecasts model estimates the future demand of different kinds of packages as described above. Accordingly, classification of these orders of different kinds of packages into m different classes according to their cubic-feet and an expected marginal delivery time. Assume $c_h^i$ represents a number of packages of type j forecasted to be ordered at time h. Assume that $\pi_h$ represents the forecast of demand for period h. $\pi_h$ may represent a multi-dimensional stochastic variable: $\pi_h=\{c_h^1, c_h^2, \ldots, c_h^m\}$. $\delta_{h,a}$ may represent the forecast of demand for periods h+1 until H, for a specific geographic location, such as a military grid reference system (MGRS) 100 m×100 m block (referred to as MGRS 100 block) containing address a. $\delta_{h,a}$ is a stochastic variable. $q_{cap}$ may represent the cubic feet capacity of a delivery vehicle. Examples of a delivery vehicle for various vehicle types that the delivery company may use including but not limited to e-bikes, cargo-vehicles, passenger cards, step-vans, box trucks of any dimensions, or any suitable delivery vehicle, respectively. $t_{cap}$ may represent the time capacity for the delivery. This capacity is referred to as the net on-zone time available in the hands of a delivery driver. With these assumptions, the package selection feature would utilize the algorithms and models to decide on a set of $A_h$ that would minimize the cost of delivery. The algorithm could be implemented by the following dynamic program:

$$DP_i(t,q)=\min\{DP_{i-1}(t,q)+o_i.b, DP_{i-1}(t-t(o_i.a), q-o_i.q)\}$$

with the stopping criterion:

$$DP_0(t_{max}, q_{max})=0$$

where t(a) is a function that represents the expectancy of delivery time for address a, and $t_{max}$ and $q_{max}$ are capacity constraints for delivery time and cubic feet, respectively. In order to achieve this result, the service provider computers implementing the package selection features needs to implement two sub-routines or algorithms or models. One for evaluating the marginal time required to deliver a package to an address (estimated delivery time) and one to estimate the distribution of orders still to be received (future forecast demand). The algorithm that decides on the set of potential subsets, $A_h$ is described in further detail with reference to FIG. 3.

In accordance with at least one embodiment, the service provider computers implementing the package selection feature and/or the dynamic program based package selection engine 102 may determine the estimated delivery time for an order 108. In embodiments, determining the estimated delivery time comes in a form of a function on the address a that takes into consideration the number of packages within set $A_h$ at this address's MGRS 100 block, as well as all accepted orders or packages, $S_h$ and anticipated demand, $\delta_{h,a}$, for this address's MGRS 100 block. Using historical delivery data for the geographical location or address, the estimated marginal time to deliver a package to address a assuming this is the $n^{th}$ package ordered at the same MGRS 100 block or geographic location, denoted t(a, n), can be derived by model fitting or by any machine learning or deep learning model suitable for this purpose including but not limited to nonlinear regression, tree based models, or neural network based models. In embodiments, this could be rather accurately estimated by a fitted function of the number of deliveries made at the same MGRS 100 block or geographic location, such that: $t(a, n)=(a+e^{-n/\beta+\gamma}) \cdot t_a$ where $\alpha$, $\beta$, and $\gamma$ are coefficients that were found to minimize the mean square error (MSE) for the model fitting; and $t_a$ is a basic constant that represents the cost of delivering exactly one package to the geographic location of address a. As t(a, n) is a function of both the address and the number of packages, the model needs to solve for how many packages one should expect at the MGRS 100 block or geographic location. It should be noted that the same determination for solving how many packages one should expect at the MGRS 100 block or geographic location can be derived by fitting any machine learning or deep learning model suitable for this purpose including but not limited to nonlinear regression, tree based models, or neural network based models. If more orders are expected to be placed for that geographic location until time H, the model needs to address the expectation. As such, the model evaluates n as the estimated number of orders to be placed at the geographic location until time H. Assume a simple function is defined N (X, a) which gets as an input a set of orders $X \in \{S_h, D_h, A_h\}$ and an address a and returns the number of orders belonging to a's geographic location within set X Assume further that the set X is arbitrarily ordered and let [i] denote the internal re-indexing of orders in this set, such that $o_w$ is the $i^{th}$ order in this ordered set. Let $X^{[j]}=\{o_{[i]}:i \geq j, o_{[i]} \in X\}$ be the partial set of all the orders indexed at least j within set X Accordingly the expectancy of the delivery time of $o_{[i]}$ is given by:

$$t(o_{[i]}.a) = \int_0^\infty t\big(a, N(S_h, a) + \delta_{h,a} + N(A_h^{[i]}, a)\big) \cdot f(\delta_{h,a}) d\delta_{h,a},$$

where $f(\delta_{h,a})$ is the probability density function (PDF) of $\delta_{h,a}$. In the formula of $t(o_{[i]}.a)$, the number of packages expected at the geographic location of address $o_{[i]}$ a comprises of three elements: the number of packages already accepted represented as N ($S_h$, a), the number of packages expected to be ordered in the remainder of the time horizon, $\delta_{h,a}$, and the number of orders that have just been ordered at period h, ($A_h^{[i]}$, a). The model or algorithm implemented by the service provider computers to determine the estimated delivery time may be performed per package for multiple geographic locations which can be stored for later use. This is applicable to a given number of packages starting from one package per block of a MGRS 100 block area to maximum realized demand per block of a MGRS 100 block area. The model or algorithm may store the coefficients as given above for each MGRS block and determine the incremental delivery time dynamically or as orders are received.

Figure 2:
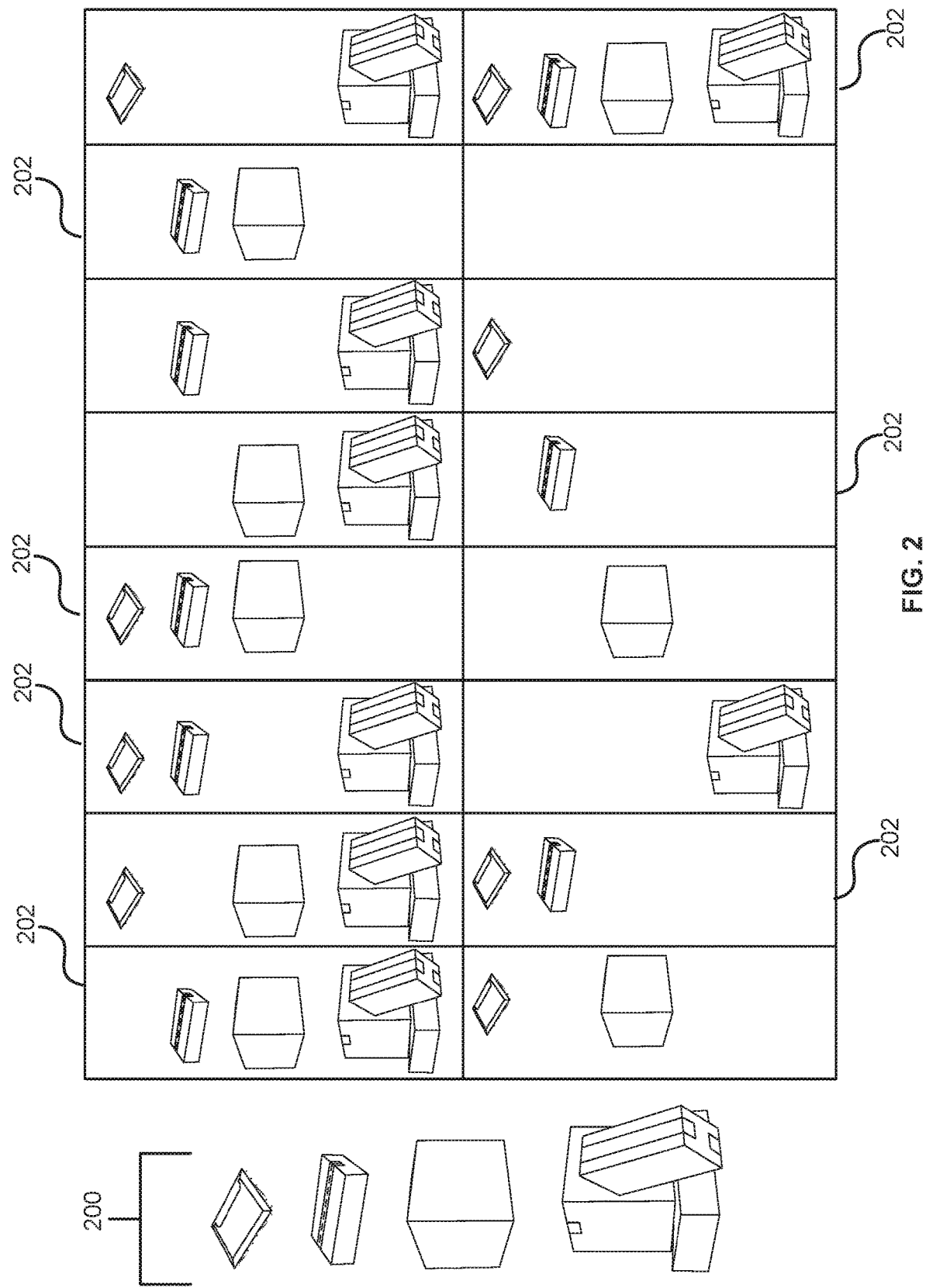
FIG. 2 illustrates potential subsets of packages that can be selected by a package selection feature, in accordance with at least one embodiment.

FIG. 2 illustrates potential subsets of packages that can be selected by a package selection feature, in accordance with at least one embodiment. FIG. 2 depicts an example of packages 200 and their respective differences in terms of cubic feet that could be received in one or more orders at a given time point during the day. As indicated herein, the service provider computers implementing the package selection feature determines a number of potential distributions or solutions 202 for arrangement of selecting certain packages from the packages 200 (set of packages). As depicted in FIG. 2, with only four packages to consider there exists 16 potential distributions or solutions 202 for which packages 200 to accept or reject, this number grows exponentially with the number of packages. The number and variance in the type of packages 200 depicted in FIG. 2 illustrate the complexity of the package selection problem considering the orders received for delivery by a typical online retailer or merchant may reach in a much higher number. The package selection feature described herein utilizes a scalable formulation that doesn't grow exponentially. The service provider computers implementing the package selection feature may utilize a nested dynamic program based on assortments of time and volume rather than combinatorics. For example, the package selection feature may utilize, for each period, boundaries for max volume and max time:

$$q_{max}=\min\{D_h \cdot q, q_{cap}-S_h \cdot q\}$$

$$t_{max}=\min\{D_h \cdot t, t_{cap}-S_h \cdot t\}.$$

Figure 3:
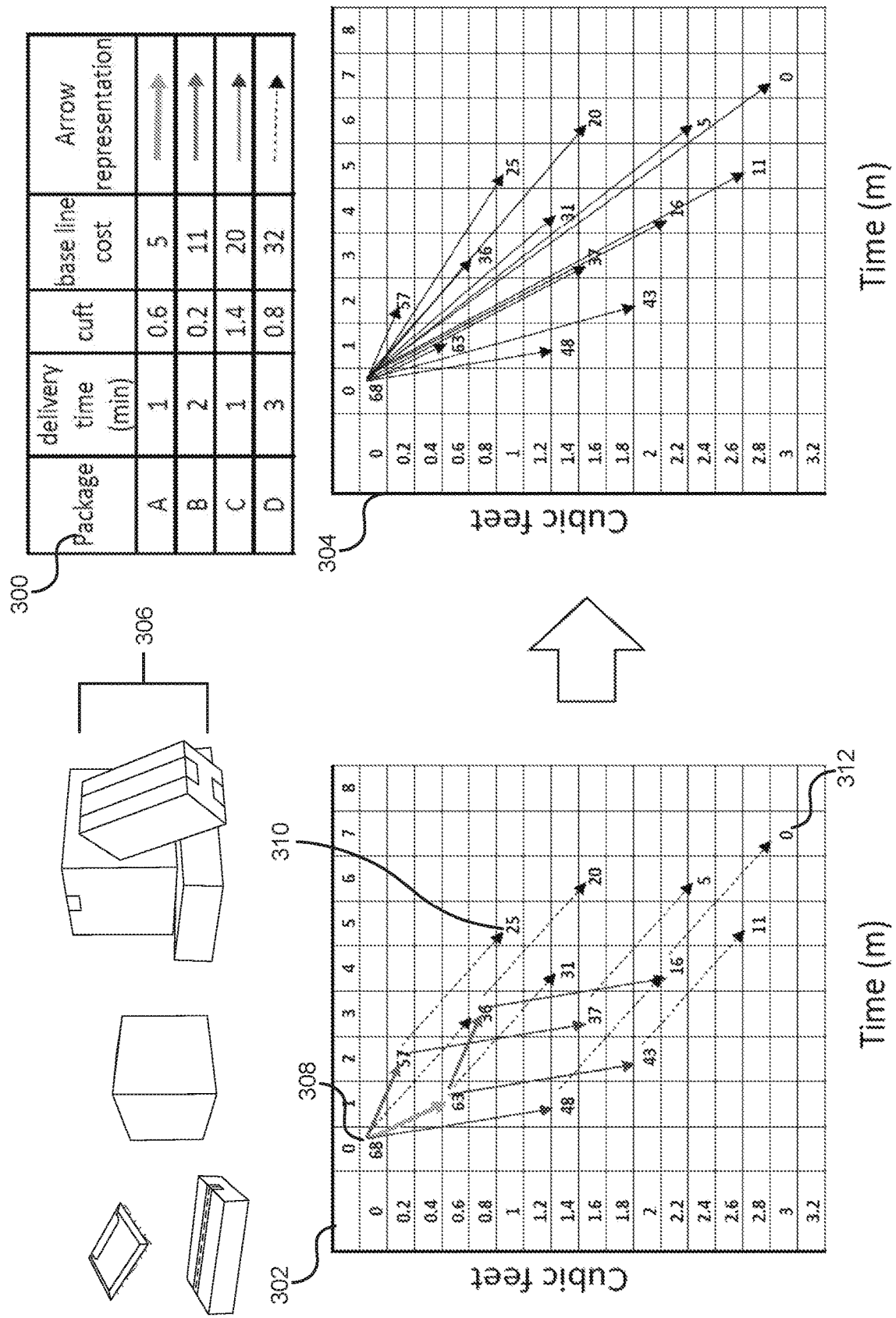
FIG. 3 illustrates a depiction of cost allocation for accepted subsets of packages and rejecting subsets of packages with limitations of cubic feet and time as generated by a package selection feature, in accordance with at least one embodiment.

FIG. 3 illustrates a depiction of cost allocation for accepted subsets of packages and rejecting subsets of packages with limitations of cubic feet and time as generated by a package selection feature, in accordance with at least one embodiment. FIG. 3 includes a key 300 for interpreting graphs 302 and 304 which illustrate potential solutions or distributions of packages 306 at a given time point for a geographic location. As indicated by the key 300, each package of packages 306 is associated with a different delivery time requirement (delivery time constraint), cubic feet, and base line cost (cost for rejecting), along with different arrows depicted on graphs 302 and 304. FIG. 3 depicts graphs 302 and 304 as depictions of implementing the package selection feature which can determine a cost for each potential solution of distribution of packages 306 where the cost can include accepting the package or rejecting the package.

For example, graph 302 illustrates the cost of rejecting all four packages A-D as 68 (308) but not consuming any cubic feet or delivery time capacity for the delivery vehicle and delivery associate. Graph 302 also depicts the cost in capacities (cubic feet and delivery time capacity) for each package A-D using the algorithms and models described herein. For example, one potential solution 310 includes accepting packages B and D but rejecting packages A and C resulting in using 5 minutes of delivery time capacity and 1 cubic foot of cubic foot capacity for the delivery vehicle while incurring a cost of 25 for rejecting packages A and C. One potential solution 312, which includes accepting all packages A-D, incurs zero cost but utilizes 7 delivery minutes and 3 cubic feet. The graph 304 represents a depiction of all potential solutions and costs determined by the package selection feature as it would appear in a 2D heat map as described in more detail with reference to FIG. 5 below. Generating the vales that correspond to capacities utilized if a particular package of packages 300 as well as the cost of rejecting a particular package of packages 300 may be determined using a first algorithm that uses the information about the packages, the estimated delivery time, and future forecasts.

As discussed above with reference to FIG. 1, the package selection feature utilizes future demand to make a decision on which packages to accept or reject. When making a decision at period h, future demand expected until period H must be determined. As the model or algorithm is dynamic it can utilize the distribution of demand for a next time period. Different classes of packages, according to their estimated marginal time of delivery, t $(o_i.a)$, their cubic feet, $o_i.q$, and the baseline cost (rejecting package) $o_i.b$ may be utilized. The algorithm or model also needs to determine realizations and for each realization a probability of occurring. Assuming $r_h$ represent the realization and $R_h$ represent the set of all realizations considered at period h. Distribution of $\pi_h$ needs to be evaluated such that determining the probability of $P(\pi_h=r_h)$ for all $r_h \in R_h$. However, the above distribution progresses exponentially.

Determining future forecasts by the package selection feature includes focusing on a next single order. By changing the period time units the forecast model can account for the next order with three stochastic dimensions: package cubic feet, package delivery time, and the time (in minutes) until the next order comes in. Assume the model defines a new variable $\tilde{o}_h$ which represents the next order to be received assuming that the current time period is represented as h. $\tilde{o}_h$ has two attributes: $\tilde{o}_h.(q,t)$ which represents the type of the next order with respect to both cubic feet, q, and delivery time, t; as well as $\tilde{o}_h.\tau$ which represents at time of day when $\tilde{o}_h$ was received or placed. The model also denotes $\Lambda$ as the set of all possible package types.

$$DYPPS_{h(S_h,D_h)} = \min_{A_h \in \Gamma_h}$$

$$\left\{ \sum_{o_i \in D_h \setminus A_h} o_i \cdot b + \sum_{s=h+1}^{H} \sum_{u \in \Lambda} DYPPS_{s(S_h \cup A_h, u)} \cdot P(\tilde{o}_h \cdot (q,t) = u) \cdot P(\tilde{o} \cdot \tau = s) \right\}$$

with the stopping criteria of $$DYPPS_{H(S_H,D_H)} = \min_{A_H \in \Gamma_H} \left\{ \begin{array}{ll} \infty & S_H \cdot t + A_H \cdot t > t_{cap} \\ \infty & S_H \cdot q + A_H \cdot q > q_{cap} \\ \sum_{o_i \in D_H \setminus A_H} o_i \cdot b & \text{otherwise} \end{array} \right\}$$

For set $\Lambda$ the model includes only package types with a probability that is above a certain threshold and normalizes the probabilities of the remaining types to sum up to 1. To calculate $P(\tilde{o}_h.(q,t)=u)$ the model assumes that the customers' ordering rate follows a Poisson distribution with an expectancy of z orders per minute and that the time until the next order follows a Geometric distribution with a probability of having the next order arrive at the next minute be represented as $$P(\tilde{o} \cdot \tau = h + 1) = p = 1 - \frac{1}{1+z}.$$

similarly, $P(\delta.\tau=s)=p\cdot(1-p)^{s-1}$. The model may truncate the time of the next order where the probability is too small and use the expectancy of time for all the orders that exceed the truncation threshold.

Figure 4:
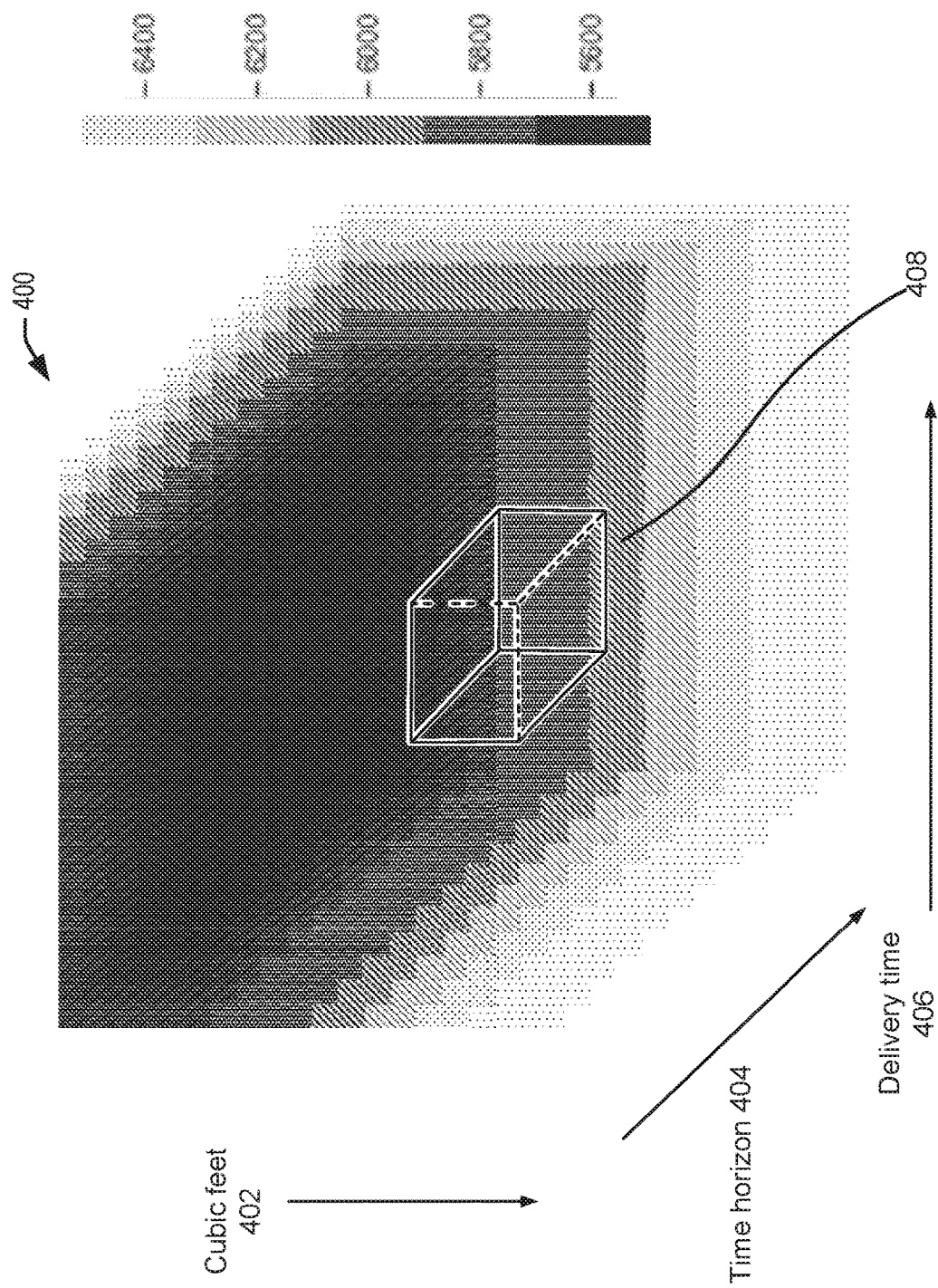
FIG. 4 illustrates three dimensional (3D) heat maps for a plurality of durations generated by a model implemented by a package selection feature, in accordance with at least one embodiment.
Figure 5:
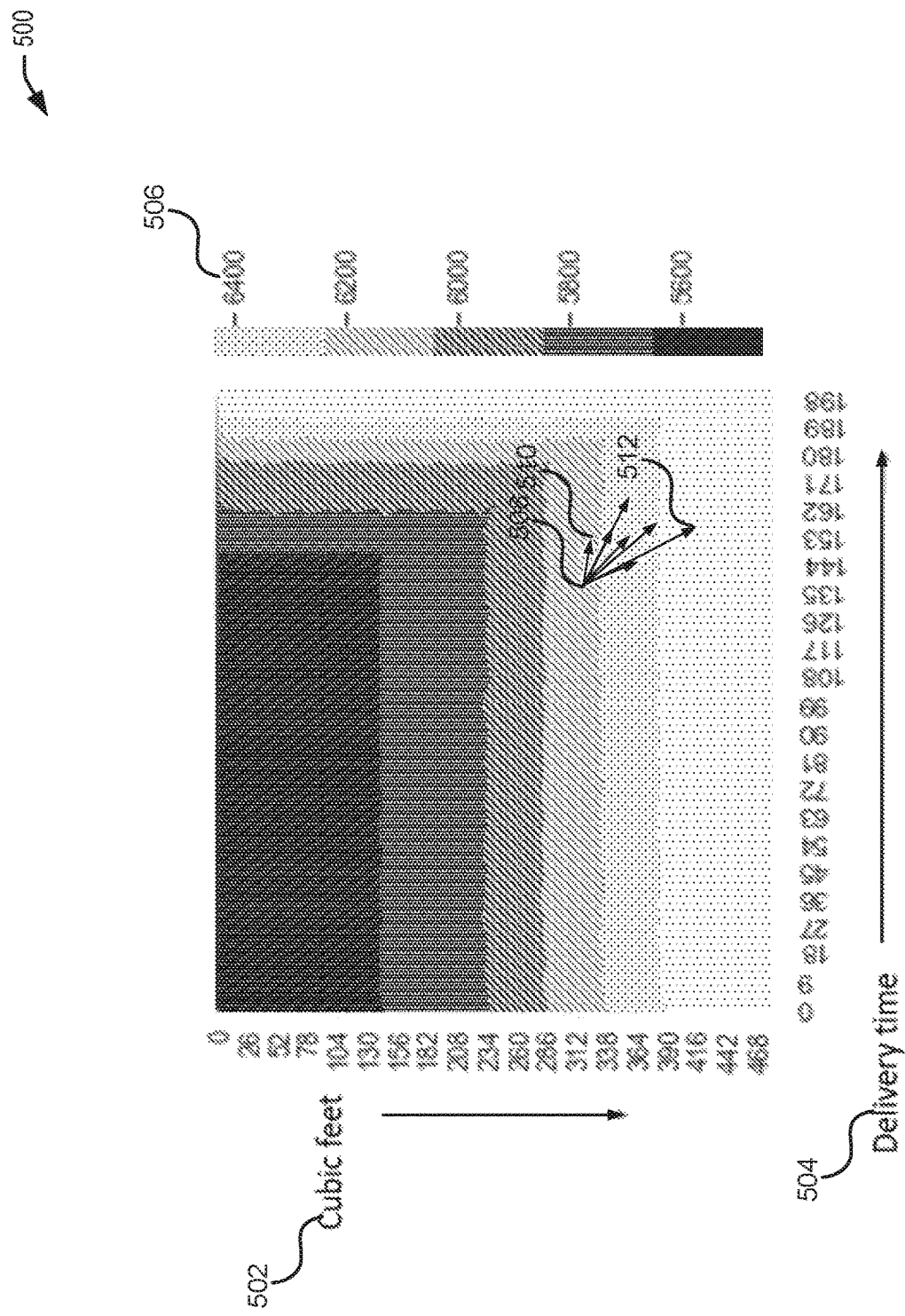
FIG. 5 illustrates a two dimensional (2D) heat map depiction of cost allocation for accepted subsets of packages and rejecting subsets of packages with limitations of cubic feet and time for a specific duration as generated by a package selection feature, in accordance with at least one embodiment.

As illustrated in FIGS. 4 and 5 the package selection feature may utilize the forecast of demand or future forecast, an estimated delivery time, information about incoming orders (package deliveries) and a value that represents the cost of rejecting a package as well as identifies the capacities of cubic feet and delivery time associated with accepting a package to select a particular package or subset of packages for delivery to a geographical area. This may be represented as a 3D grid or heat map.

FIG. 4 illustrates three dimensional (3D) heat maps for a plurality of durations generated by a model implemented by a package selection feature, in accordance with at least one embodiment. In embodiments, the package selection feature represents a multi-dimensional stochastic dynamic program that may call itself (algorithms and/or models) many times each time it is utilized to select packages. To avoid redundant calculation the value returned each time the package selection feature is utilized may be stored in a lookup table. The package selection feature utilizes certain granularities such that the lookup table can be used to generate a 3D grid or heat map. Assuming the lookup table is represented by L(h, t, q) such that each time of day h, accumulated on-zone-time, t, and accumulated cubic feet, q combination is associated with a cost. The lookup table may be represented as a heat map or collection of heat maps 400 for an entire day. The heat maps 400 represent the growth in expected cost as the available capacity decreases for every time of day. The heat maps 400 depicts L (h, t, q) whereas the singular heat map illustrated in FIG. 5 represents the lookup table for a single period (time of day).

In embodiments, the service provider computer may utilize a Taylor series with two levels to bridge a gap between different granularities between a nested dynamic program and the package selection model or algorithm. As illustrated in FIG. 4, the 3D heat maps 400 include dimensions for cubic feet 402, time horizon 404, and delivery time 406. The box of points 408 depicted a crossing between layers of heat maps 400 represent the potential solutions of selecting a package or packages at a given point of time, its associated cost, which is multiplied by the probability or all potential probabilities to give an estimated cost that is viewed from one layer to the next. In other words, the box of points 408 may represent the impact of the next single order with 3 dimensions of distribution—cubic feet, delivery time, and the time the order was placed. This box takes the costs from the heat maps of future periods and multiplies them by the distribution to give an expectancy of cost. Using this method recursively for each point, the method may construct the entire 3D heat map.

FIG. 5 illustrates a two dimensional (2D) heat map 500 depiction of cost allocation for accepted subsets of packages and rejecting subsets of packages with limitations of cubic feet and time for a specific duration as generated by a package selection feature, in accordance with at least one embodiment. The heat map 500 includes the cubic feet 502 capacity or cost as well as the delivery time 504 capacity or cost along with a scale 506 that represents the heat map 500 expected cost incurred if one had that certain capacities at the specific time of day. The graph 304 of FIG. 3 may be represented as arrows 510 and 512 with a base of the arrows 508.

The representation of arrows 510 and 512 may represent the calculation of estimated cost in capacity in cubic feet 502 and delivery time 504 as well as the cost of rejecting the order along scale 506 for one or more solutions that include selecting or rejecting subsets of packages, such as packages A-D 306 of FIG. 3. For example, suppose a solution that is represented by arrow 510 is selected by the algorithm implemented by the service provider computers utilizing the future forecasts, the estimated delivery time, the information about orders or a set of packages, and a value. The cost for each subsequent potential solution (represented in FIG. 4 as box 408 of FIG. 4) for future orders in the same time period (day) for the geographical area may increase the overall cost as capacity for cubic feet 502 and delivery time 504 is utilized. As another example, the particular solution represented by arrow 512 is depicted as a more expensive solution in terms of cost according to scale 506, cubic feet 502 utilized, and delivery time 504. Nonetheless, the selection cost of 512 might be less expensive than that of 510, as it rejected less\smaller packages. To choose the best subset the costs of each vector 304 are added with the difference in cost of transition from one point to another on the heat map 506. Typically as a delivery window closes (e.g., towards the end of a day) potential solutions are more expensive as less cubic feet 502 capacity and delivery time 504 capacity is available.

Figure 6:
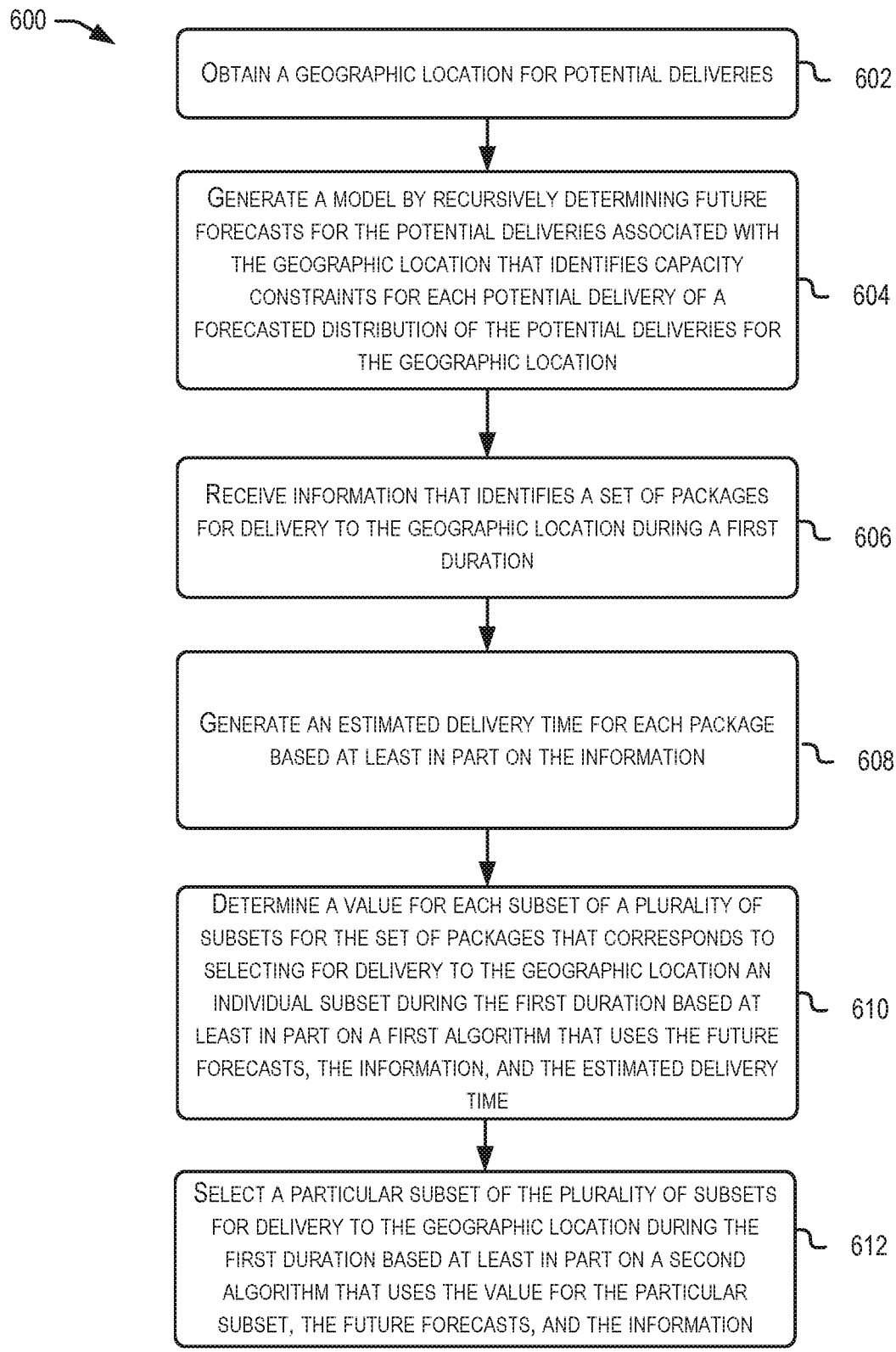
FIG. 6 illustrates an example flow diagram for a package selection feature, in accordance with at least one embodiment.
Figure 7:
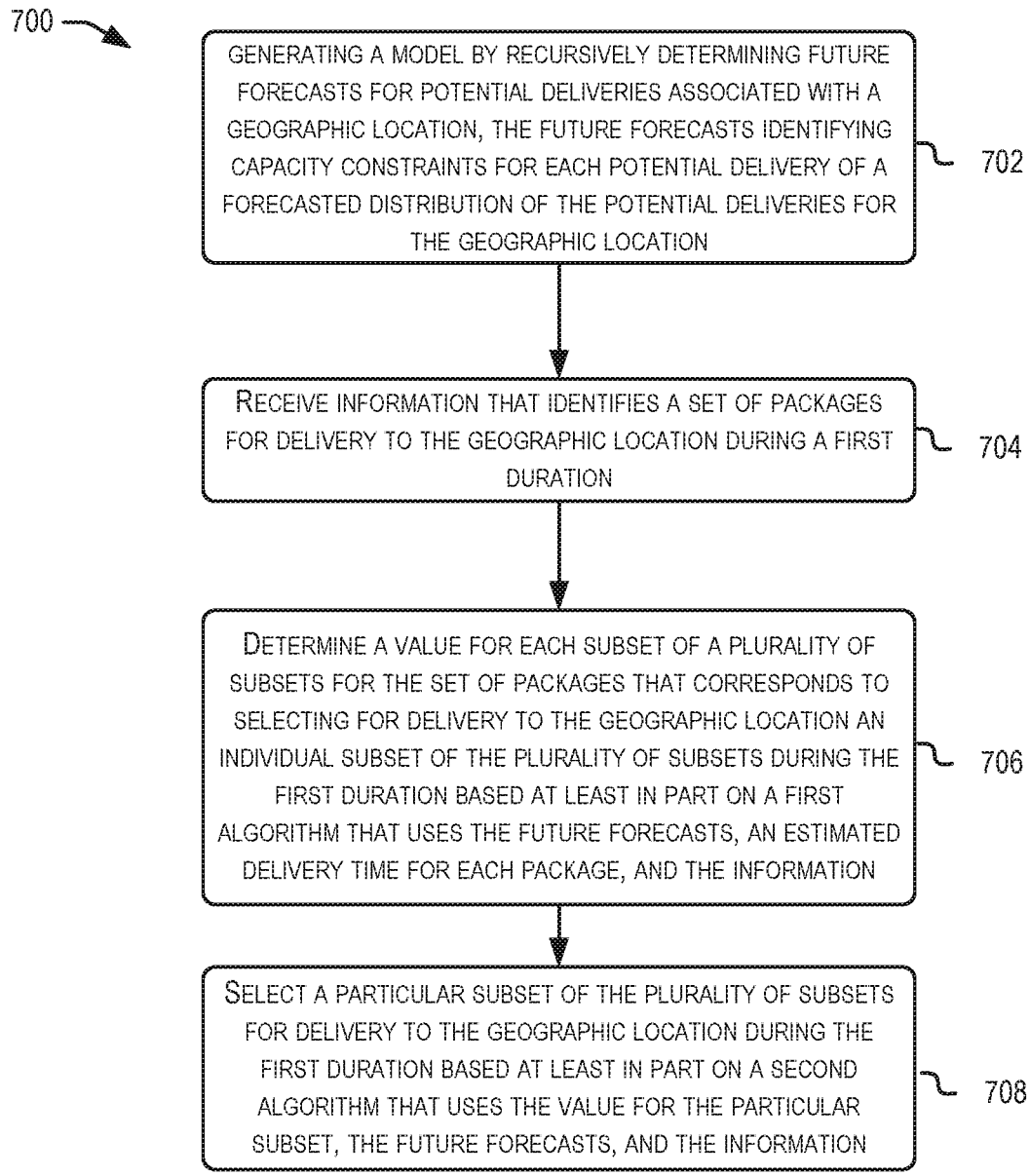
FIG. 7 illustrates an example flow diagram for a package selection feature, in accordance with at least one embodiment.

FIGS. 6 and 7 illustrate example flow charts for package selection features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the descried operations can be combined in any order and/or in parallel to implement the process.

Additionally, some, any, or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
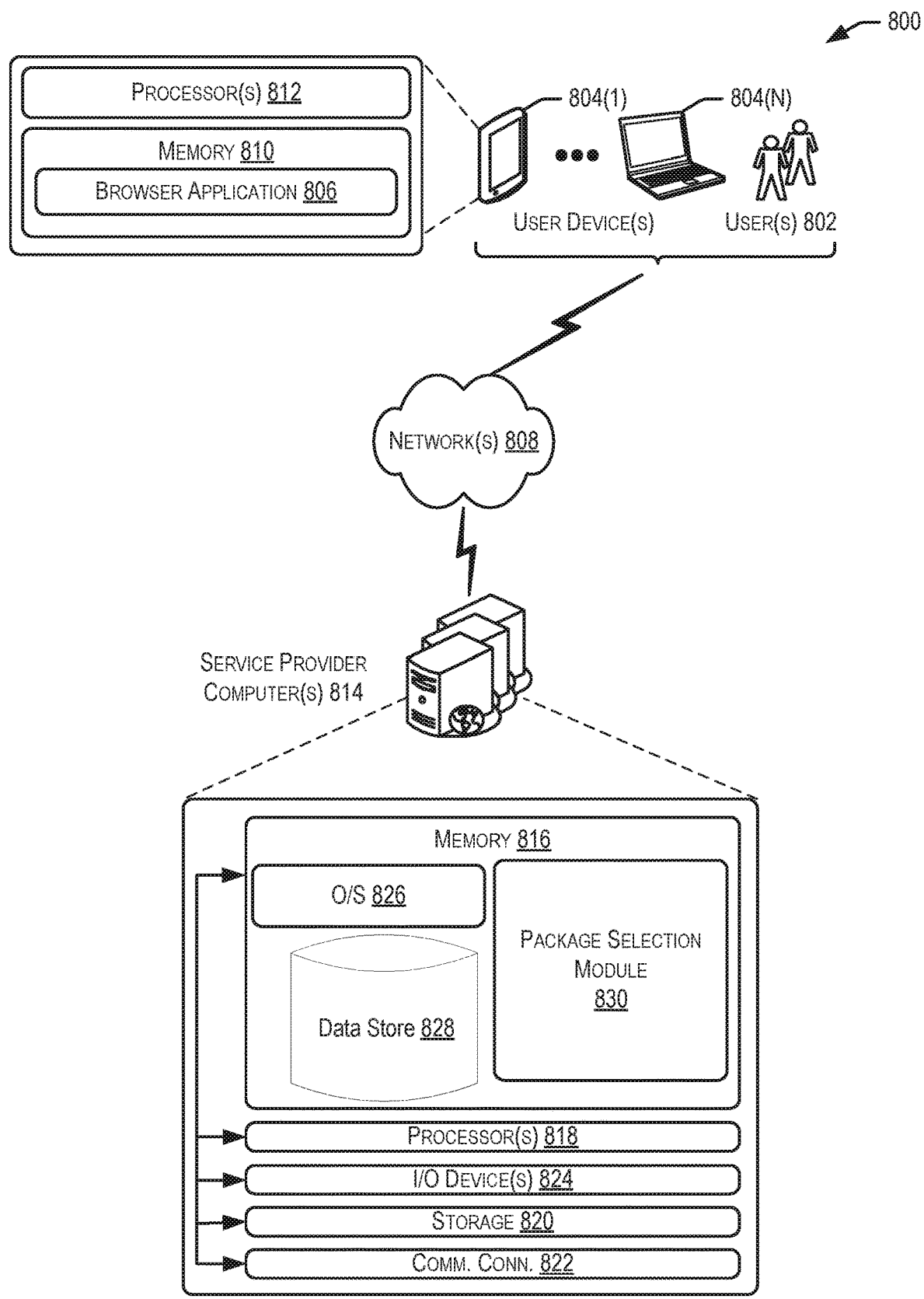
FIG. 8 illustrates an example architecture for implementing a package selection feature, in accordance with at least one embodiment.

In some examples, the service provider computers (service provider computers 814) utilizing at least the package selection module 830 depicted in FIG. 8 may perform the processes 600 and 700 of FIGS. 6 and 7. In FIG. 6, the process 600 may include obtaining a geographic location for potential deliveries at 602. In embodiments, the potential deliveries may correspond to expected deliveries for the geographic location during a certain time period. The process 600 may include generating a model by recursively determining future forecasts for the potential deliveries associated with the geographic location that identifies capacity constraints for each potential delivery of a forecasted distribution of the potential deliveries for the geographic location at 604. In accordance with at least one embodiment, the future forecasts are translated, by the model, into expected costs for the forecasted distribution of the potential deliveries for the geographic location. The model may be generated based at least in part on a delivery time constraint, the capacity constraints, delivery vehicle capacity, and historical delivery data for the geographic location. In embodiments, the capacity constraints may include at least cubic feet and delivery location for each potential delivery. Each forecast of the future forecasts may correspond to a certain duration of time.

The process 600 may include receiving information that identifies a set of packages for delivery to the geographic location during a first duration at 606. In embodiments, the information includes the cubic feet for each package of the set of packages, the delivery time constraint for each package, the delivery location for each package, and a cost associated with a third party delivery entity. The process 600 may include generating an estimated delivery time for each package based at least in part on the information at 608. In embodiments, the estimated delivery time may correspond to an estimated amount of time for a delivery entity to deliver the package to a delivery location. The process 600 may include determining a value for each subset of a plurality of subsets for the set of packages that corresponds to selecting for delivery to the geographic location an individual subset during the first duration based at least in part on a first algorithm that uses the future forecasts, the information, and the estimated delivery time at 610.

The process 600 may include selecting a particular subset of the plurality of subsets for delivery to the geographic location during the first duration based at least in part on a second algorithm that uses the value for the particular subset, the future forecasts, and the information at 612. In accordance with at least one embodiment, the service provider computers implementing the package selection feature may update the first algorithm or the second algorithm based on the particular subset selected for the first duration. In embodiments, the delivery time constraint may be pre-generated by an entity, such as an administrator, associated with the service provider computers. In accordance with at least one embodiment, the estimated delivery time for each package may be pre-generated by a delivery entity, by an administrator associated with the service provider computers, or by a machine learning algorithm implemented by the service provider computers based at least in part on the information. In embodiments, the information may further identify another set of packages already selected for delivery to the geographic location during a previous duration, for example in the previous fifteen minutes.

The process 700 of FIG. 7 may include generating a model by recursively determining future forecasts for potential deliveries associated with a geographic location at 702. The future forecasts may identify capacity constraints for each potential delivery of a forecasted distribution of the potential deliveries for the geographic location. The process 700 may include receiving information that identifies a set of packages for delivery to the geographic location during a first duration at 704. The process 700 may include determining a value for each subset of a plurality of subsets for the set of packages that corresponds to selecting for delivery to the geographic location an individual subset of the plurality of subsets during the first duration based at least in part on a first algorithm at 706. The first algorithm may use the future forecasts, an estimated delivery time for each package, and the information to determine the value for each subset. The process 700 may include selecting a particular subset of the plurality of subsets for delivery to the geographic location during the first duration based at least in part on a second algorithm that uses the value for the particular subset, the future forecasts, and the information at 708.

In embodiments, the service provider computers implementing the package selection feature may generate instructions for storing the particular subset of packages into a delivery vehicle and transmit the instructions to a user device, such as a user device of a delivery entity or associate. In accordance with at least one embodiment, the service provider computers may determine a rejection value for each subset that corresponds to not selecting for delivery to the geographical location the individual subset of the plurality of subsets during the first duration based at least in part on the first algorithm that uses the future forecasts, the estimated delivery time for each package, and the information. In embodiments, the first algorithm does not determine, or is limited by, maximum capacity constraints for each package and delivery vehicle. In embodiments, the information may include the estimated delivery time for each package of the set of packages. The information may include a duration or time of day when the order for when the set of packages were received for the delivery to the geographic location. The service provider computers implementing the package selection feature may generate and transmit instructions to a third party computer associated with a third party delivery entity that identifies the packages rejected or not selected including identifying another subset of the plurality of subsets of packages for delivery to the geographic location.

FIG. 8 illustrates an example architecture for implementing a package selection feature, in accordance with at least one embodiment. In architecture 800, one or more users 802 (e.g., delivery associates, users, consumers, etc.,) may utilize user computing devices 804(1)-(N) (collectively, user devices 804) to access a browser application 806 or a user interface (UI) accessible through the browser application 806, via one or more networks 808 to receive instructions for selecting a particular subset of packages for delivery to a geographical area using a delivery vehicle. The "browser application" 806 can be any browser control or native application that can access and display a network page or other information such as a user interface of a native software application for enabling the presentation of a delivery route, representation of geographic units for an area, or to provide historical and/or average delivery volume data, as well as information for identifying particular subsets of packages for storing in a delivery vehicle to deliver to the geographical area. A native software application may include an application or program that has been developed for use on a particular platform (such as an operating system) or a particular device (such as a particular type of mobile device or user device 804). In embodiments, the user device 804 may include one or more components for enabling the user 802 to interact with the browser application 806.

The user devices 804 may include at least one memory 810 and one or more processing units or processor(s) 812. The memory 810 may store program instructions that are loadable and executable on the processor(s) 812, as well as data generated during the execution of these programs. Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 810 may include multiple different types of memory, such as static random access memory (SRAM), dynamic random access memory (DRAM), or ROM.

Turning to the contents of the memory 810 in more detail, the memory 810 may include an operating system and one or more application programs or services for implementing the features disclosed herein. Additionally, the memory 810 may include one or more modules for implementing the features described herein including a package selection module 830.

The architecture 800 may also include one or more service provider computers 814 that may, in some examples, provide computing resources such as, but not limited to, client entities, low latency data storage, durable data store, data access, management, virtualization, hosted computing environment or "cloud-based" solutions, package selection feature implementation, etc. The service provider computers 814 may implement or be an example of the service provider computer(s) described herein with reference to FIGS. 1-7 and throughout the disclosure. The one or more service provider computers 814 may also be operable to provide site hosting, computer application development, and/or implementation platforms, combinations of the foregoing, or the like to the one or more users 802 via user devices 804.

In some examples, the networks 808 may include any one or a combination of many different types of networks, such as cable networks, the Internet, wireless networks, cellular networks, and other private and/or public networks. While the illustrated examples represents the users 802 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another. In embodiments, the service provider computers 814 may be in communication with one or more third party computers (not pictured) via networks 808 to receive or otherwise obtain data including third party rates for delivering packages not selected by the package selection feature described herein.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the features disclosed herein including the package selection module 830. In accordance with at least one embodiment, the package selection module 830 is configured to implement one or more models or algorithms as described herein to determine a future forecast for potential deliveries associated with a geographical area, determine a value for each subset of a plurality of subsets packages that correspond to current delivery requests to the geographical area, selecting a particular subset of the plurality of subsets of packages for delivery during a certain time period or certain duration of a given day for delivery to the geographical area. In embodiments, the package selection module 830 and service provider computers 814 may be configured to receive or otherwise obtain information that identifies packages for delivery to a geographical area during a certain duration, for example during a fifteen minute interval of a given day. The package selection module 830 and the service provider computers 814 may obtain information about the capacity constraints for a delivery vehicle such as cubic feet available in a vehicle at a given time as well as driver duration or capacity to deliver packages to the geographical area. The package selection module 830 and the service provider computers 814 may receive or obtain historical delivery data for a geographical area for use in generating a forecasted demand for the geographical area. The package selection module 830 and the service provider computers 814 may be configured to generate and transmit instructions to user devices as well as third party computers. The instructions may identify which particular packages to select for picking and storing in a delivery vehicle for eventual delivery to a delivery location. The instructions may also identify which particular packages are not selected (rejected). Instructions may be provided to third party delivery entities to deliver the packages which are not selected via the package selection feature described herein. Entities associated with the service provider computers 814 or delivery entities may specify constraints and/or parameters for the models and algorithms described herein. For example, a user (entity) may specify the geographical area to determine future forecasts for, a maximum capacity in cubic feet for a delivery vehicle, a maximum driver time capacity or threshold to deliver packages within a given geographical area, etc. The package selection module 830 may be configured to generate and transmit delivery routes for a geographic unit of a geographic area to one or more delivery associates who are delivering the packages on a given day. The service provider computers 814 may transmit the delivery routes to the user devices 804 of users 802 (delivery associates or delivery entities) via networks 808. Package selection instructions may also be generated and transmitted by the package selection module 830 and transmitted, via service provider computers 814 and networks 808, to user devices 804 of users 802.

Figure 9:
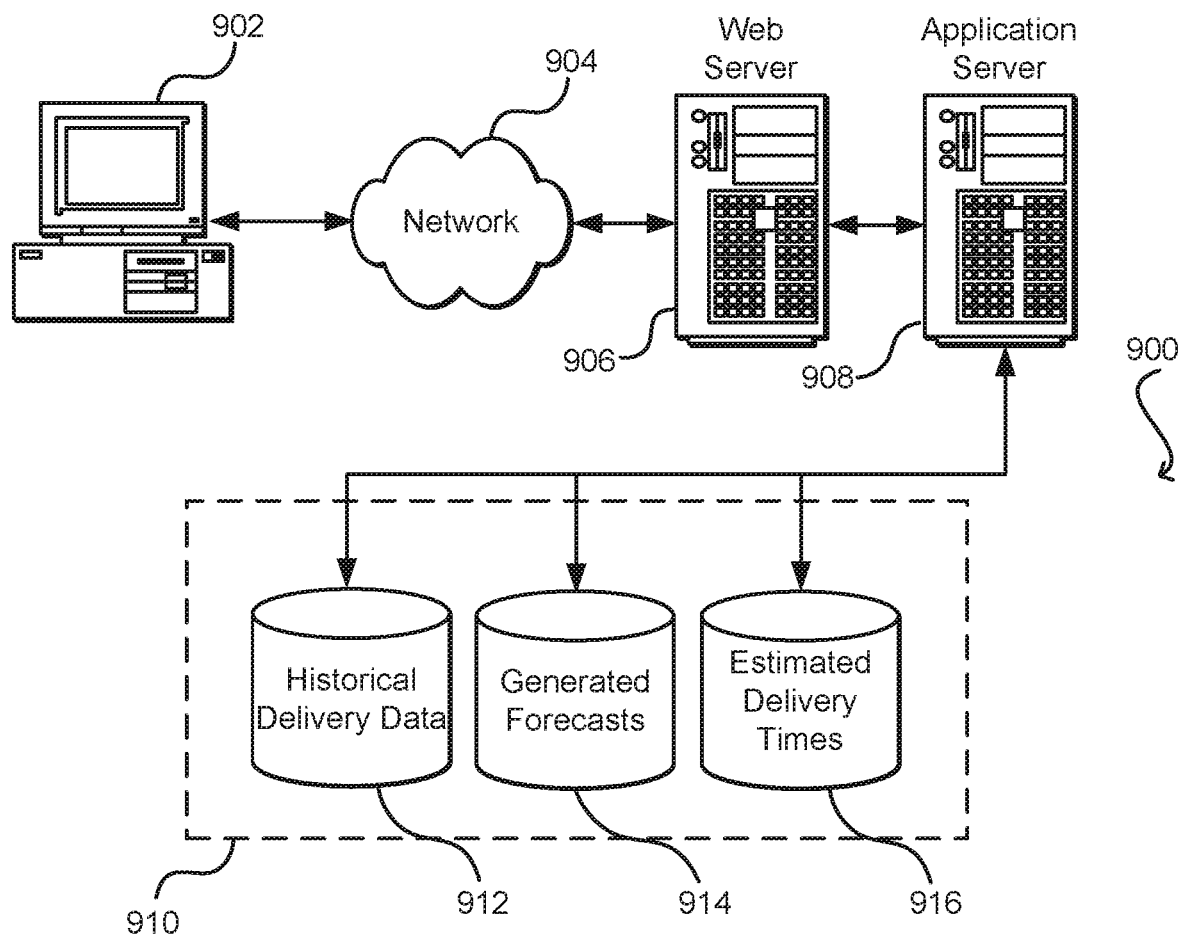
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing historical delivery data 912 and estimated delivery times 916, which can be used to serve content for the production side as well as generate demand forecasts for a geographical area, implement algorithms for determining values to associate with subsets of packages for delivery during a certain duration, and select specific subsets of packages for delivery. The data store also is shown to include a mechanism for storing generated forecasts 914, which can be used for reporting, analysis, or other such purposes such as determining subsets of packages from a plurality of packages for delivery during a certain duration on a given day. The generated forecasts 914 may be continually updated and maintained separately for each geographical area. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

obtaining, by a computer system, a geographic location for potential deliveries;

generating, by the computer system, a model by recursively determining future forecasts for the potential deliveries associated with the geographic location that identifies capacity constraints for each potential delivery of a forecasted distribution of the potential deliveries for the geographic location, the future forecasts translated, by the model, into expected costs for the forecasted distribution of the potential deliveries for the geographic location, the model generated based at least in part on a delivery time constraint, the capacity constraints, delivery vehicle capacity, and historical delivery data for the geographic location within a certain time period that is specified by an entity associated with the computer system, the capacity constraints including at least cubic feet and delivery location for each potential delivery, and each future forecast of the future forecasts corresponding to a certain duration;

receiving, by the computer system, information that identifies a set of packages for delivery to the geographic location during a first duration, the information including the cubic feet for each package of the set of packages, the delivery time constraint for each package, the delivery location for each package, and a cost associated with a third party delivery entity;

generating, by the computer system, an estimated delivery time for each package based at least in part on the information;

determining, by the computer system, a value for each subset of a plurality of subsets for the set of packages that corresponds to selecting for delivery to the geographic location an individual subset of the plurality of subsets during the first duration based at least in part on a first machine learning algorithm that uses the future forecasts, the information, and the estimated delivery time, wherein the first machine learning algorithm does not determine the value for a corresponding subset outside of maximum capacity constraints for each package and a delivery vehicle;

determining, by the computer system, a rejection value for each subset that corresponds to not selecting for delivery to the geographic location the individual subset of the plurality of subsets during the first duration based at least in part on the first machine learning algorithm that uses the future forecasts, the estimated delivery time, and the information;

selecting, by the computer system, a particular subset of the plurality of subsets for delivery to the geographic location during the first duration based at least in part on a second machine learning algorithm that uses the value for the particular subset, the future forecasts, and the information;

updating, by the computer system, the first machine learning algorithm and the second machine learning algorithm based at least in part on the particular subset of the plurality of subsets selected for the first duration;

receiving, by the computer system, updated information that identifies the set of packages for delivery to the geographic location during a second duration; and determining, by the computer system, the value for each subset of a plurality of subsets for the set of packages that corresponds to selecting for delivery to the geographic location the individual subset of the plurality of subsets during the second duration based at least in part on the updated first machine learning algorithm.

2. The computer-implemented method of claim 1, wherein the delivery time constraint is pre-generated by the entity associated with the computer system.

3. The computer-implemented method of claim 1, wherein the estimated delivery time for each package is pre-generated by a delivery entity.

4. The computer-implemented method of claim 1, wherein the information further identifies another set of packages already selected for delivery to the geographic location during a previous duration and forecasts the expectancy of deliveries to be placed at the geographic location during future durations.

5. A non-transitory computer-readable storage medium storing computer-executable instructions that, when executed by a computer system, configure the computer system to perform operations comprising:

generating a model by recursively determining future forecasts for potential deliveries associated with a geographic location, the future forecasts identifying capacity constraints for each potential delivery of a forecasted distribution of the potential deliveries for the geographic location, the model generated based at least in part on the capacity constraints, delivery vehicle capacity, and historical delivery data for the geographic location within a certain time period that is specified by an entity associated with the computer system, the capacity constraints including at least cubic feet and delivery location for each potential delivery, the future forecasts translated, by the model into expected costs for the forecasted distribution of the potential deliveries for the geographic location, and each future forecast corresponding to a certain duration;

receiving information that identifies a set of packages for delivery to the geographic location during a first duration, the information including the cubic feet for each package of the set of packages, a delivery time constraint for each package, the delivery location for each package, and a cost associated with a third party delivery entity;

determining a value for each subset of a plurality of subsets for the set of packages that corresponds to selecting for delivery to the geographic location an individual subset of the plurality of subsets during the first duration based at least in part on a first machine learning algorithm that uses the future forecasts, an estimated delivery time for each package, and the information, wherein the first machine learning algorithm does not determine the value for a corresponding subset outside of maximum capacity constraints for each package and a delivery vehicle;

determining a rejection value for each subset that corresponds to not selecting for delivery to the geographic location the individual subset of the plurality of subsets during the first duration based at least in part on the first machine learning algorithm that uses the future forecasts, the estimated delivery time, and the information;

selecting a particular subset of the plurality of subsets for delivery to the geographic location during the first duration based at least in part on a second machine learning algorithm that uses the value for the particular subset, the future forecasts, and the information;

updating the first machine learning algorithm and the second machine learning algorithm based at least in part on the particular subset of the plurality of subsets selected for the first duration;

receiving updated information that identifies the set of packages for delivery to the geographic location during a second duration; and determining the value for each subset of a plurality of subsets for the set of packages that corresponds to selecting for delivery to the geographic location the individual subset of the plurality of subsets during the second duration based at least in part on the updated first machine learning algorithm.

6. The non-transitory computer-readable storage medium of claim 5, wherein the instructions, when executed by the computer system, further configure the computer system to perform operations comprising:

generating instructions for storing the particular subset of packages into a delivery vehicle; and transmitting, to a user device, the instructions.

7. The non-transitory computer-readable storage medium of claim 5, wherein the information further includes the estimated delivery time for each package of the set of packages.

8. The non-transitory computer-readable storage medium of claim 5, wherein the model initially determines a future forecast of the future forecasts at the end of the certain time period.

9. The non-transitory computer-readable storage medium of claim 8, wherein the certain time period can be specified by a delivery entity.

10. The non-transitory computer-readable storage medium of claim 5, wherein determining the value for each subset based at least in part on the first machine learning algorithm includes using a probability associated with another subset of packages being received during in a future duration.

11. The non-transitory computer-readable storage medium of claim 10, wherein the probability corresponds to a geometric probability of the another subset of packages being received during the future duration.

12. A computer system comprising:
a memory configured to store computer-executable instructions; and
a processor in communication with the memory configured to execute the computer-executable instructions to at least:
generating a model by recursively determining future forecast for potential deliveries associated with a geographic location, the future forecasts identifying capacity constraints for each potential delivery of a forecasted distribution of the potential deliveries for the geographic location, the model generated based at least in part on the capacity constraints, delivery vehicle capacity, and historical delivery data for the geographic location within a certain time period that is specified by an entity associated with the computer system, the capacity constraints including at least cubic feet and delivery location for each potential delivery, the future forecasts translated, by the model into expected costs for the forecasted distribution of the potential deliveries for the geographic location, and each future forecast corresponding to a certain duration;

receiving information that identifies a set of packages for delivery to the geographic location during a first duration, the information including the cubic feet for each package of the set of packages, a delivery time constraint for each package, the delivery location for each package, and a cost associated with a third party delivery entity;

determining a value for each subset of a plurality of subsets for the set of packages that corresponds to selecting for delivery to the geographic location an individual subset of the plurality of subsets during the first duration based at least in part on a first machine learning algorithm that uses the future forecasts, an estimated delivery time for each package, and the information, wherein the first machine learning algorithm does not determine the value for a corresponding subset outside of maximum capacity constraints for each package and a delivery vehicle;

determining a rejection value for each subset that corresponds to not selecting for delivery to the geographic location the individual subset of the plurality of subsets during the first duration based at least in part on the first machine learning algorithm that uses the future forecasts, the estimated delivery time, and the information;

selecting a particular subset of the plurality of subsets for delivery to the geographic location during the first duration based at least in part on a second machine learning algorithm that uses the value for the particular subset, the future forecasts, and the information;

updating the first machine learning algorithm and the second machine learning algorithm based at least in part on the particular subset of the plurality of subsets selected for the first duration;

receiving, by the computer system, updated information that identifies the set of packages for delivery to the geographic location during a second duration; and determining, by the computer system, the value for each subset of a plurality of subsets for the set of packages that corresponds to selecting for delivery to the geographic location the individual subset of the plurality of subsets during the second duration based at least in part on the updated first machine learning algorithm.

13. The computer system of claim 12, wherein the information includes a time of day at which the set of packages were received for the delivery to the geographic location.

14. The computer system of claim 12, wherein determining the value for each subset using the first machine learning algorithm is further based at least in part on a maximum volume of deliveries during the certain duration for the geographic location.

15. The computer system of claim 12, wherein determining the value for each subset using the first machine learning algorithm is further based at least in part on a maximum time capacity for a delivery entity to make deliveries during the certain duration for the geographic location.

16. The computer system of claim 15, wherein the information further identifies the maximum time capacity for the delivery entity.

17. The computer system of claim 12, wherein the processor in communication with the memory is further configured to execute the computer-executable instructions to at least:

generate instructions that identify another subset of the plurality of subsets that is not selected for delivery to the geographic location based at least in part on the second machine learning algorithm that uses the value for the another subset, the future forecasts, and the information; and transmit, to a third party computer, the instructions.

* * * * *